(12) United States Patent
Chang

(10) Patent No.: US 10,098,501 B2
(45) Date of Patent: Oct. 16, 2018

(54) GRILL

(71) Applicant: Tsann Kuen (Zhangzhou) Enterprise Co., Ltd., Zhangzhou (CN)

(72) Inventor: Wenyu Chang, Zhangzhou (CN)

(73) Assignee: TSANN KUEN (ZHANGZHOU) ENTERPRISE CO., LTD., Zhangzhou (CN)

( * ) Notice: Subject to any disclaimer, the term of this patent is extended or adjusted under 35 U.S.C. 154(b) by 184 days.

(21) Appl. No.: 15/175,162

(22) Filed: Jun. 7, 2016

(65) Prior Publication Data

US 2016/0360926 A1 Dec. 15, 2016

(30) Foreign Application Priority Data

Jun. 12, 2015 (CN) .......................... 2015 1 0322990

(51) Int. Cl.
| | |
|---|---|
| *A47J 37/06* | (2006.01) |
| *A47J 37/07* | (2006.01) |
| *A47J 36/24* | (2006.01) |
| *A47J 37/04* | (2006.01) |
| *A47J 43/18* | (2006.01) |

(52) U.S. Cl.
CPC ....... *A47J 37/0704* (2013.01); *A47J 36/2483* (2013.01); *A47J 37/041* (2013.01); *A47J 37/049* (2013.01); *A47J 37/0611* (2013.01); *A47J 43/18* (2013.01); *A47J 2037/0617* (2013.01)

(58) Field of Classification Search
CPC ....................... A47J 37/0611; A47J 2037/0617
USPC ........................... 99/377, 378, 376, 375, 372
See application file for complete search history.

(56) References Cited

U.S. PATENT DOCUMENTS

| | | | | |
|---|---|---|---|---|
| 1,556,767 A | * | 10/1925 | Dodge, Jr. ........... | A47J 37/0611 99/339 |
| 1,900,619 A | * | 3/1933 | Snyder ................ | A47J 37/0611 99/376 |
| 6,016,741 A | | 1/2000 | Tsai | |
| 2009/0165657 A1 | * | 7/2009 | Cheng .................. | A47J 37/041 99/443 R |
| 2010/0162903 A1 | | 7/2010 | Chen | |
| 2015/0320258 A1 | * | 11/2015 | Huang .................. | A47J 36/32 99/331 |

FOREIGN PATENT DOCUMENTS

GB 2133674 8/1984

OTHER PUBLICATIONS

Extended European Search Report for EP16173475 dated Oct. 31, 2016.

* cited by examiner

*Primary Examiner* — Reginald L Alexander
(74) *Attorney, Agent, or Firm* — Burris Law, PLLC

(57) ABSTRACT

A grill includes a base seat and a grill mechanism. The grill mechanism is mounted to the base seat, and includes a lower grill unit, an upper grill unit pivoted to the lower grill unit, and an auxiliary heating unit disposed on one of the upper and lower grill units. The grill mechanism is operable to rotate relative to the base seat to a draining position. The auxiliary heating unit includes an auxiliary heating pan heated by heat emitted from the one of the upper and lower grill units, and an affixing member mounted to the auxiliary heating pan for holding a food disposed on the auxiliary heating pan.

9 Claims, 16 Drawing Sheets

GRILL

CROSS-REFERENCE TO RELATED APPLICATION

This application claims priority of Chinese Patent Application No. 201510322990.5, filed on Jun. 12, 2015.

FIELD

The disclosure relates to a grill, and more particularly to a grill operable to drain oil released from foods.

BACKGROUND

Foods may release oil when being grilled. After a conventional grill is used, the grilled food and a grill pan of the conventional grill may be oily. The grilled food and the grill pan need to be separated from each other so as to be de-oiled by paper towels. Such operation is laborious. Moreover, power may be inefficiently used in the conventional grill.

SUMMARY

Therefore, an object of the disclosure is to provide a grill that can alleviate at least one of the drawbacks of the prior art.

According to the disclosure, the grill includes a base seat and a grill mechanism. The grill mechanism is rotatably mounted to and disposed substantially horizontally on the base seat, and includes a lower grill unit, an upper grill unit that is disposed above and pivotally connected to the lower grill unit, and an auxiliary heating unit that is disposed on and in thermal contact with one of the upper and lower grill units. The lower grill unit includes a lower pan module that is rotatably mounted to and disposed substantially horizontally on the base seat, and a lower heating module that is disposed on the lower pan module. The upper grill unit includes an upper pan module that is pivoted to the lower pan module, and an upper heating module that is disposed on the upper pan module. The grill mechanism is operable to rotate relative to the base seat to a draining position where the lower pan module is substantially vertically disposed. The auxiliary heating unit includes an auxiliary heating pan that is heated by heat emitted from the one of the upper and lower grill units, and an affixing member that is mounted to the auxiliary heating pan for holding a food disposed on the auxiliary heating pan.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
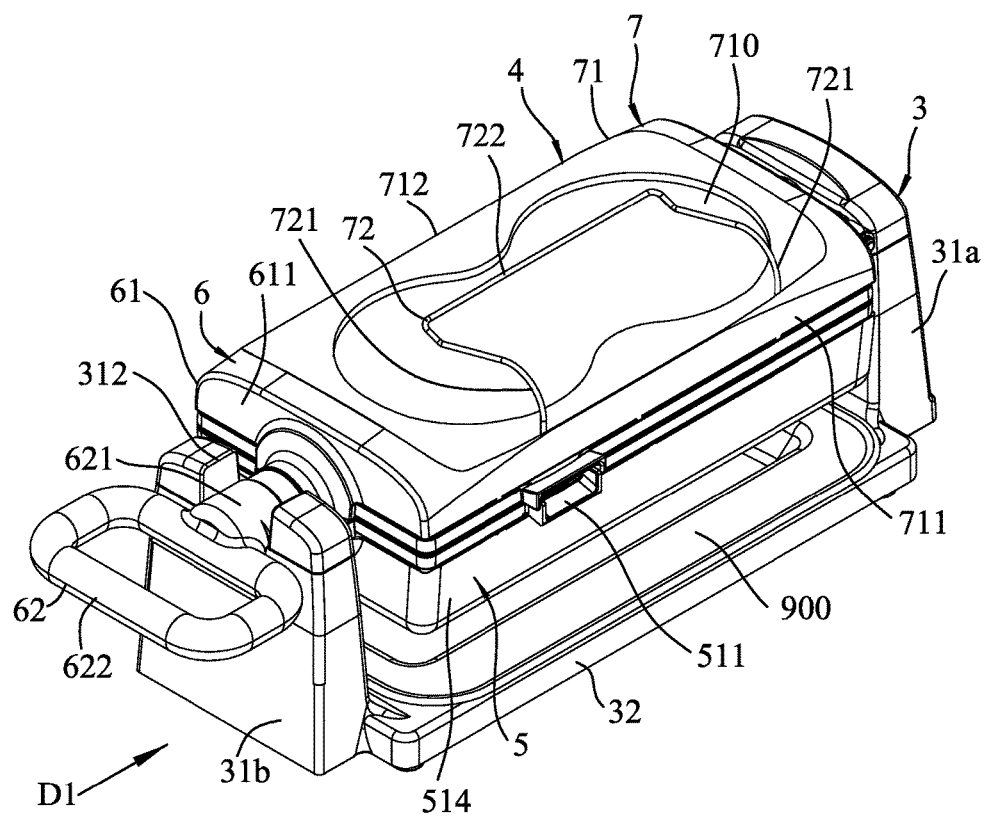
FIG. 1 is a perspective view illustrating a first embodiment of a grill according to the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 3:
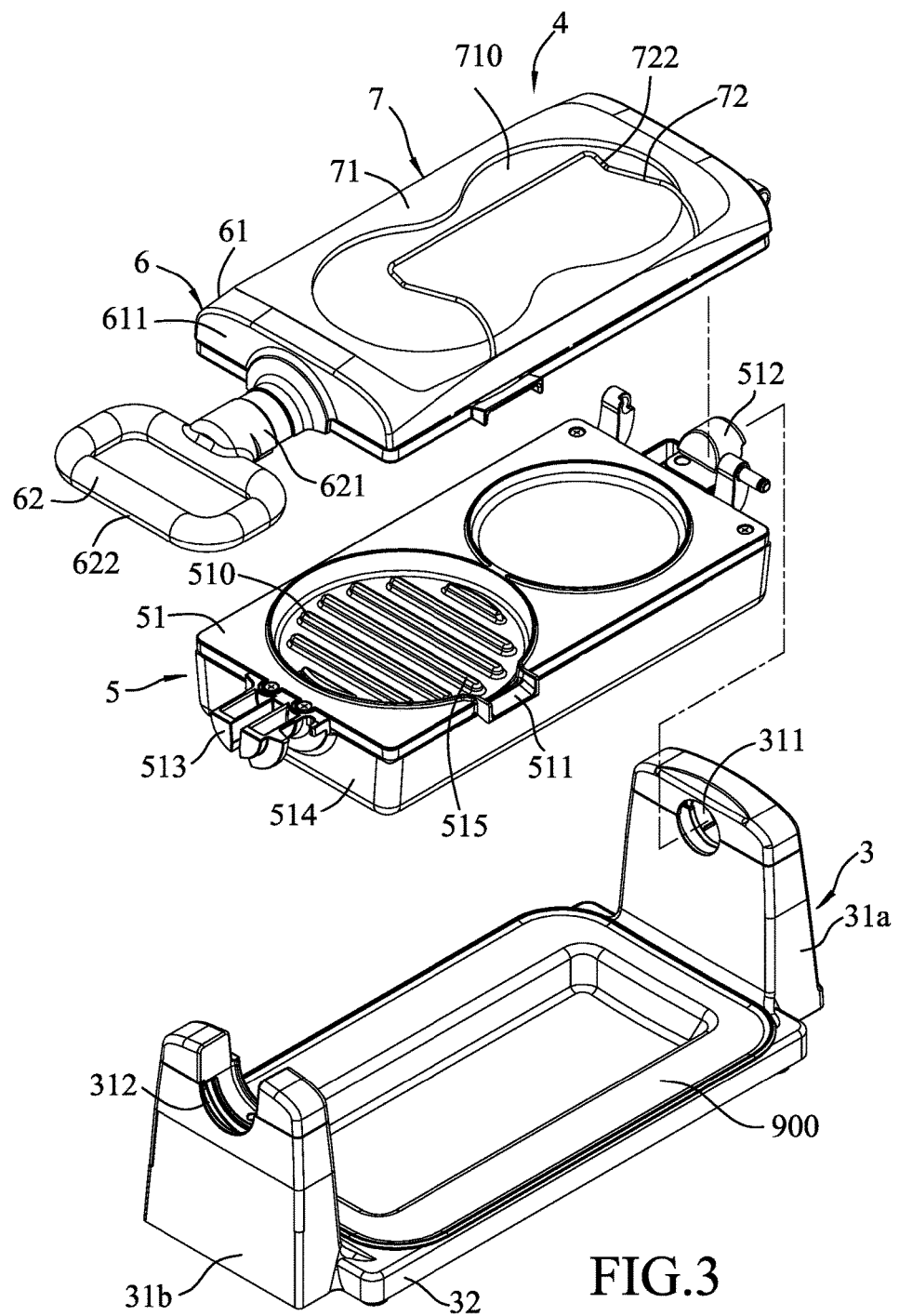
FIG. 3 is a partly exploded perspective view illustrating the first embodiment.

Referring to FIGS. 1 and 3, the first embodiment of the grill according to the disclosure includes abase seat 3, and a grill mechanism 4 that is disposed on the base seat 3 and that is rotatable relative to the base seat 3.

The base seat 3 includes left and right side frames 31*a*, 31*b* that are spaced apart from each other in a first direction (D1), and a base frame 32 that is connected between the left and right side frames 31*a*, 31*b*. A pivot hole 311 (see FIG. 3) is formed in a top portion of the left side frame 31*a*. A pivot groove 312 is formed in a top surface of the right side frame 31*b*, extends in the first direction (D1) and through the right side frame 31*b*, and is aligned with the pivot hole 311 in the first direction (D1). The base frame 32 permits a drip tray 900 to be disposed thereon.

The grill mechanism 4 is removably mounted to the base seat 3, and includes a lower grill unit 5, an upper grill unit 6 that is disposed above and connected pivotally to the lower grill unit 5, and an auxiliary heating unit 7 that is disposed on the upper grill unit 6.

Figure 2:
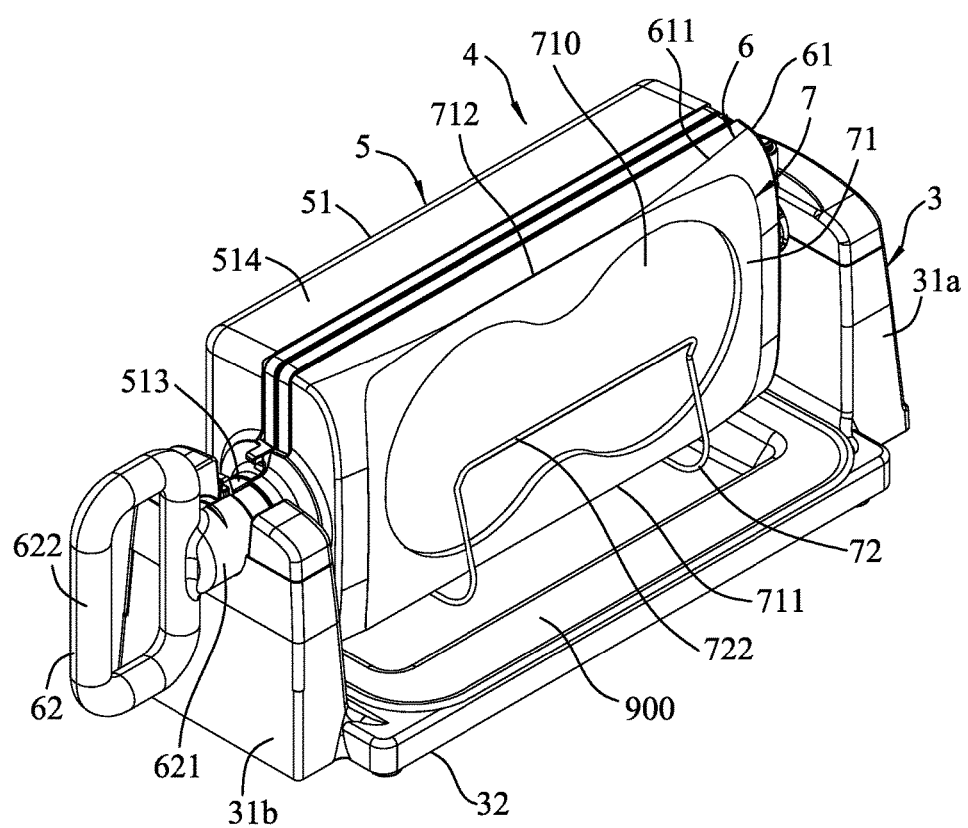
FIG. 2 is a schematic perspective view illustrating the first embodiment at a draining position.
Figure 5:
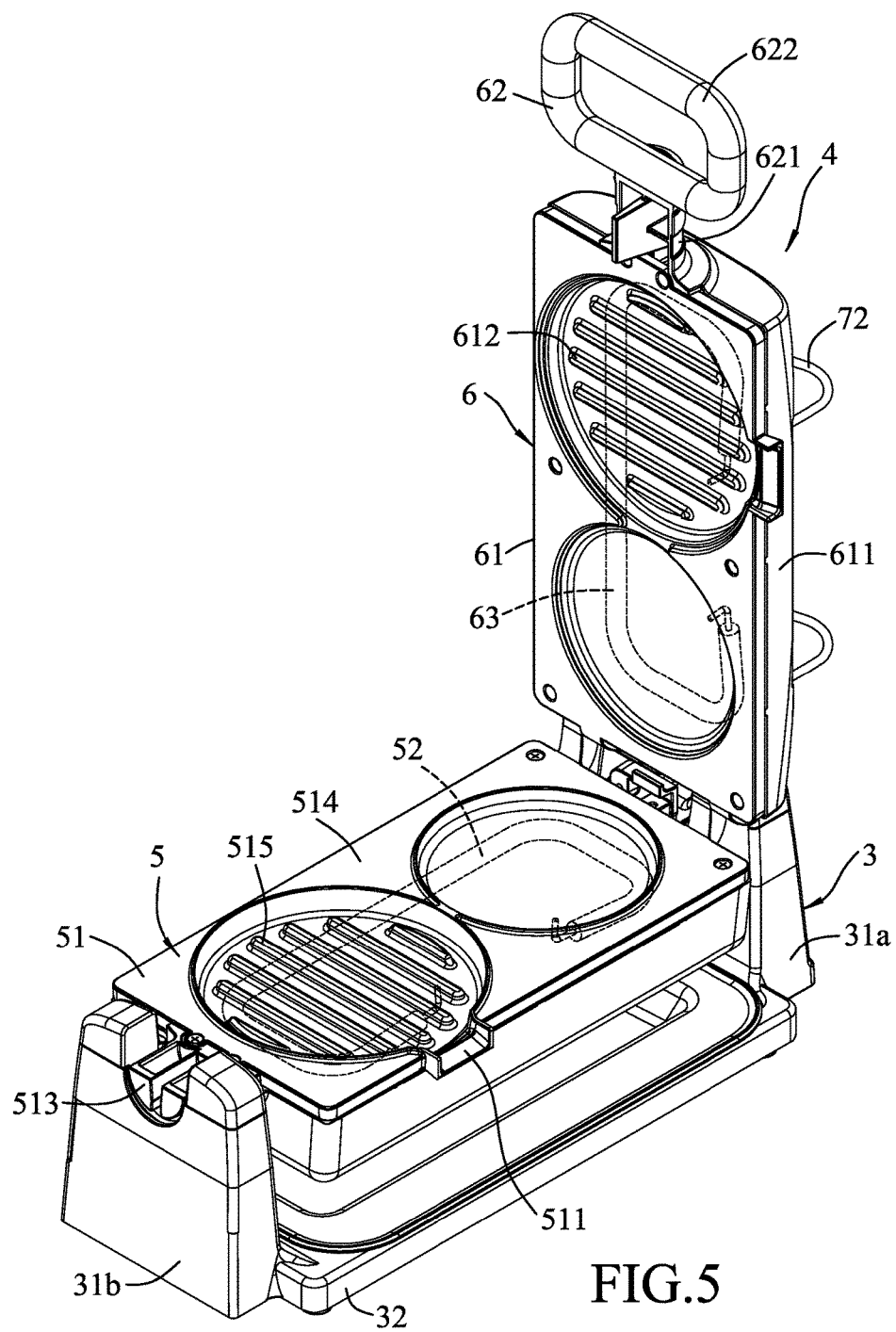
FIG. 5 is another schematic perspective view illustrating the first embodiment.

Referring to FIGS. 1, 2 and 5, the lower grill unit 5 includes a lower pan module 51 that is removably mounted to and horizontally disposed between the left and right side frame 31*a*, 31*b*, and a lower heating module 52 that is disposed in the lower pan module 51. The lower pan module 51 includes a lower casing 514, and a lower pan 515 mounted to the lower casing 514. The lower heating module 52 is powered by electricity to generate heat for heating the lower pan 515. The configuration of the lower heating module 52 is known in this art, and will not be further described in the following paragraphs.

Figure 4:
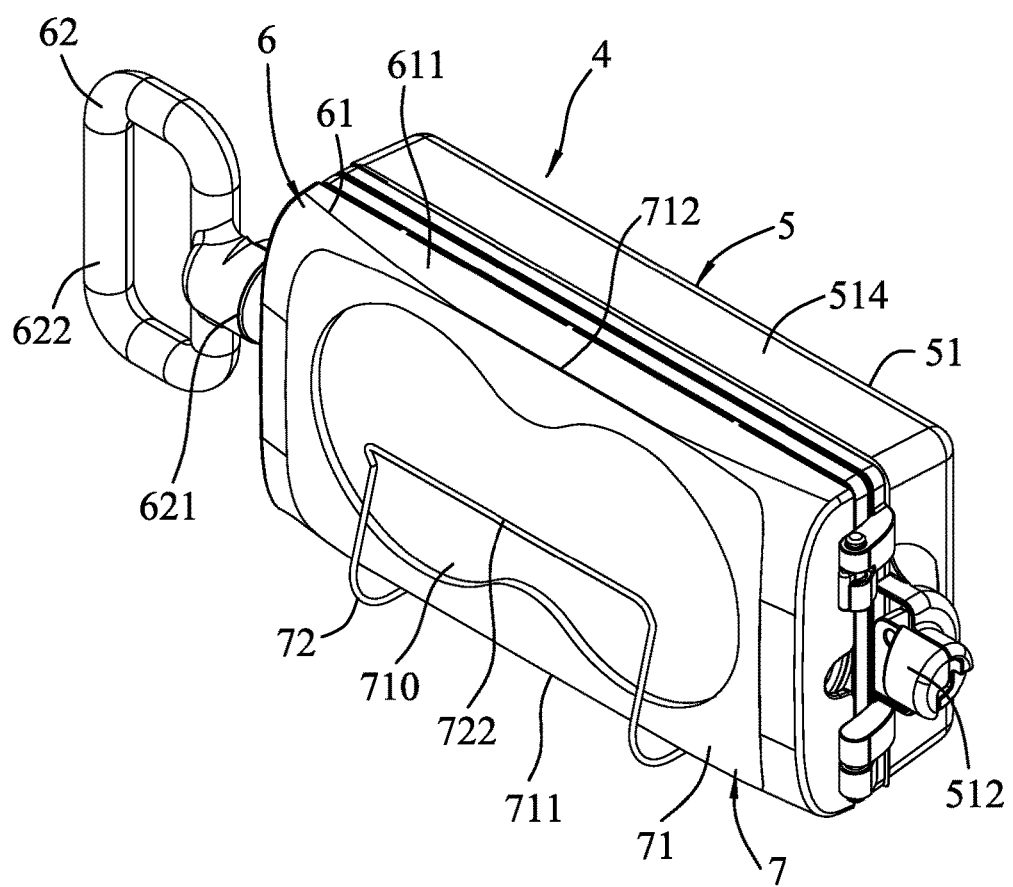
FIG. 4 is a perspective view illustrating a grill mechanism of the first embodiment.
Figure 6:
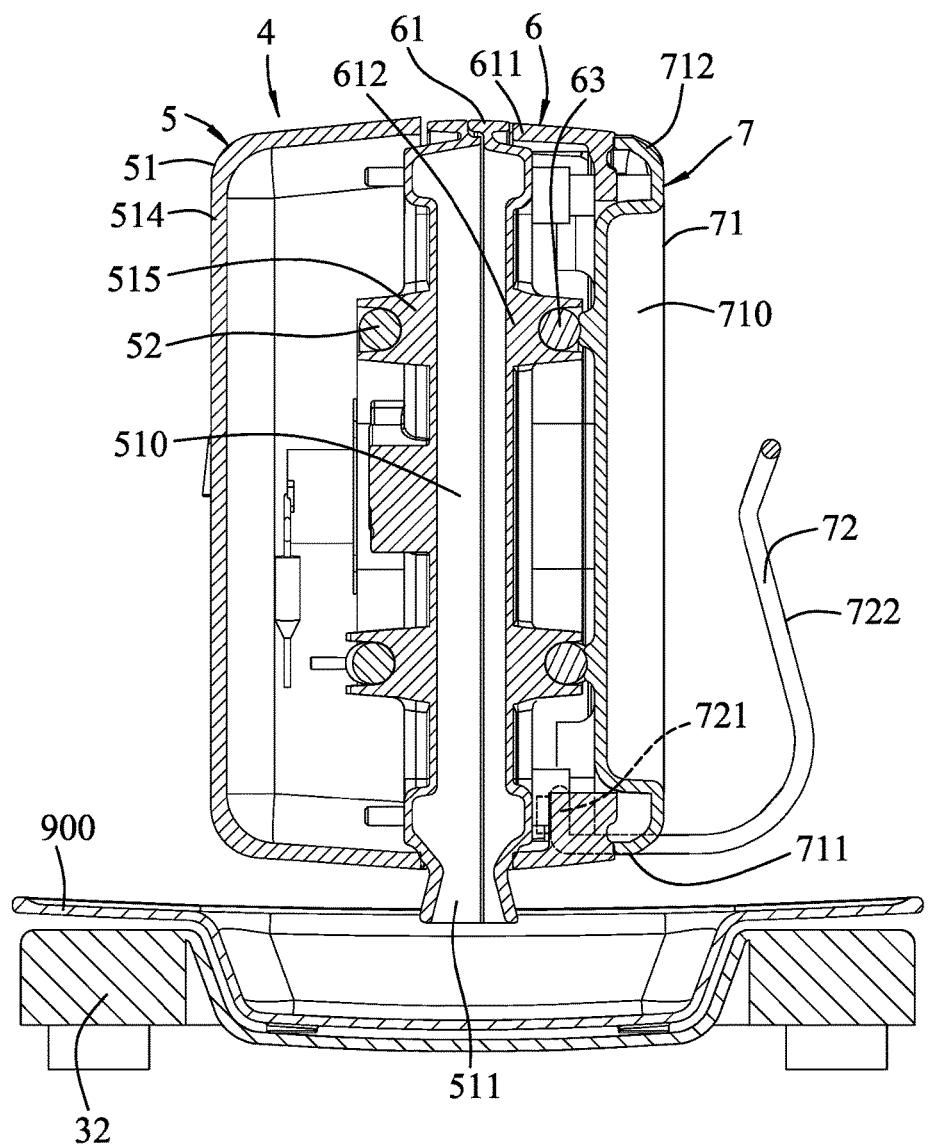
FIG. 6 is a sectional view illustrating the first embodiment.

Referring further to FIGS. 3, 4 and 6, the lower pan 515 has a lower grill space 510 that is formed in a top surface thereof, and an oil-draining opening 511 that is formed in a side surface thereof and that is in spatial communication with the lower grill space 510. The lower casing 514 has a first axle portion 512 that rotatably and removably engages the pivot hole 311 in the left side frame 31*a*, and a hemi-cylindrical second axle portion 513.

Referring to FIGS. 3, 5 and 6, the upper grill unit 6 includes a upper pan module 61 that is pivoted to the lower pan module 51 so as to removably cover the lower grill space 510, a handle 62 that is connected fixedly to the upper pan module 61, and an upper heating module 63 that is disposed in the upper pan module 61. The upper heating module 63 is powered by electricity to generate heat for heating the upper pan module 61.

The upper pan module 61 includes an upper casing 611, and an upper pan 612 mounted to the upper casing 611. The upper casing 611 has a portion that is proximate to the left side frame 31a and that is pivoted to a portion of the lower casing 514 proximate to the left side frame 31a. The upper pan 612 removably covers the lower grill space 510, and cooperates with the lower pan 515 to simultaneously heat two opposite sides of a food that is retained in the lower grill space 510. The handle 62 has a hemicylindrical connecting axle portion 621 that extends from one side of the upper casing 611 distal from the left side frame 31a, and a ring-shaped handle portion 622 that is connected fixedly to a distal end of the connecting axle portion 621 for manual operation. The connecting axle portion 621 cooperates with the second axle portion 513 of the lower casing 514 to form a cylindrical axle that rotatably and removably engages the pivot groove 312 in the right side frame 31b.

The upper grill unit 6 is operable to uncover the lower grill space 510 (see FIG. 5) so as to facilitate placement of the food into the lower grill space 510.

The grill mechanism 4 is operable to rotatable relative to the base seat 3 to a draining position (see FIGS. 2, 4 and 6) where the lower pan 515 is vertically disposed and the oil-draining opening 511 is located under the lower grill space 510 and opens downwardly.

The auxiliary heating unit 7 is fixedly disposed on and in thermal contact with a top surface of the upper casing 611 of the upper grill unit 6 distal from the lower grill unit 5, and includes an auxiliary heating pan 71 and an affixing member 72. The auxiliary heating pan 71 is fixedly mounted on the top surface of the upper casing 611, and is heated by the heat emitted from the upper grill unit 6. The auxiliary heating pan 71 has a retaining groove 710 that is formed in a top surface thereof distal from the lower grill unit 5, and first and second side edges 711, 712 that are opposite to each other in a direction transverse to the first direction (D1). The first side edge 711 is proximate to the oil-draining opening 511. The second side edge 712 is distal from the oil-draining opening 511.

The affixing member 72 is configured as a bent and flexible metal wire, and is mounted to the auxiliary heating pan 71. The affixing member 72 is substantially U-shaped, and has two installation segments 721 that are spaced apart from each other in the first direction (D1) and that are fixedly connected to the first side edge 711 of the auxiliary heating pan 71, and an abutment segment 722 that interconnects distal ends of the installation segments 721, that corresponds in position to the retaining groove 710 of the auxiliary heating pan 71, and that extends away from and is spaced apart from the auxiliary heating pan 71.

In use, the lower pan 515 and upper pan 612 cooperatively and simultaneously grill two opposite sides of the food (e.g., meat) retained in the lower grill space 510, and the auxiliary heating pan 71 heats a food (e.g., bread or toast) disposed in the retaining groove 710. When the food in the lower grill space 510 is grilled and releases oil, the grill mechanism 4 can be rotated to the draining position by turning the handle 62, so that the oil released from the food is drained from the lower grill space 510 of the lower pan 515 via the oil-draining opening 511 and drips into the drip tray 900. During rotation of the grill mechanism 4 relative to the base seat 3, the food disposed in the retaining groove 710 is held by the affixing member 72 so as to be prevented from being separated from the auxiliary heating pan 71.

Figure 7:
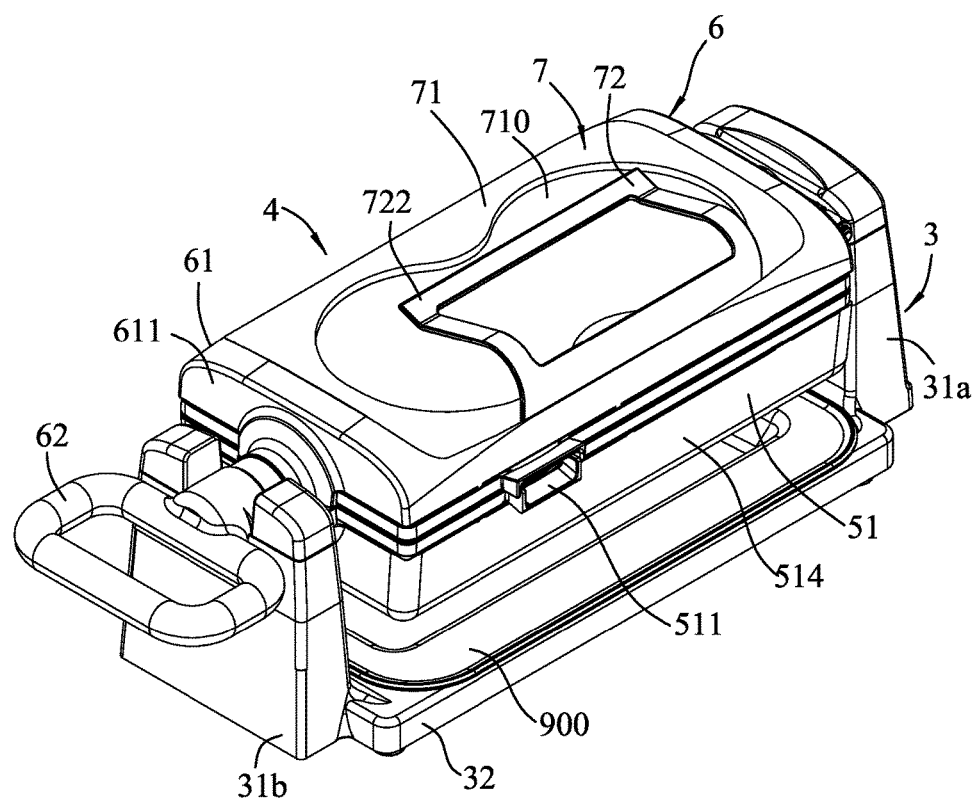
FIG. 7 is a perspective view illustrating a second embodiment of the grill according to the disclosure.

Referring to FIG. 7, the second embodiment of the grill according to the disclosure is similar to the first embodiment. The difference between the first and second embodiments resides in that the affixing member 72 is configured as a flexible metal plate for holding the food disposed in the retaining groove 710 of the auxiliary heating pan 71.

Figure 8:
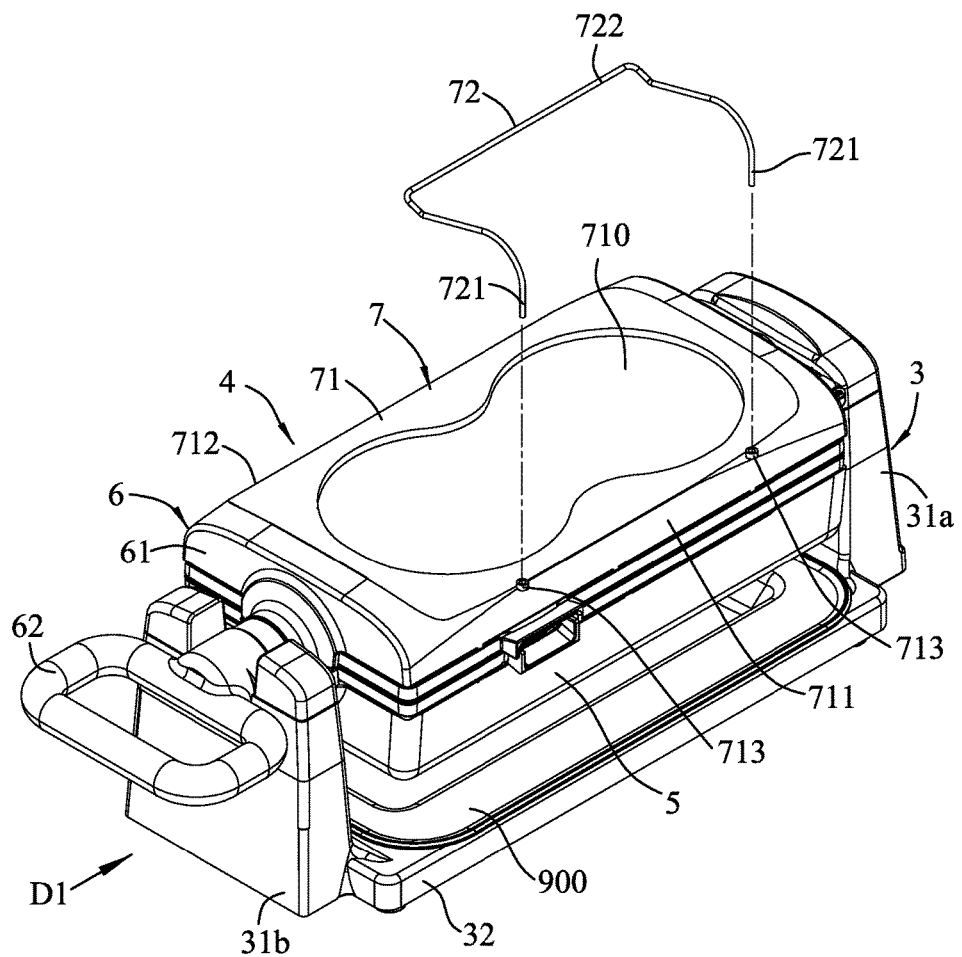
FIG. 8 is a partly exploded perspective view illustrating a third embodiment of the grill according to the disclosure.
Figure 9:
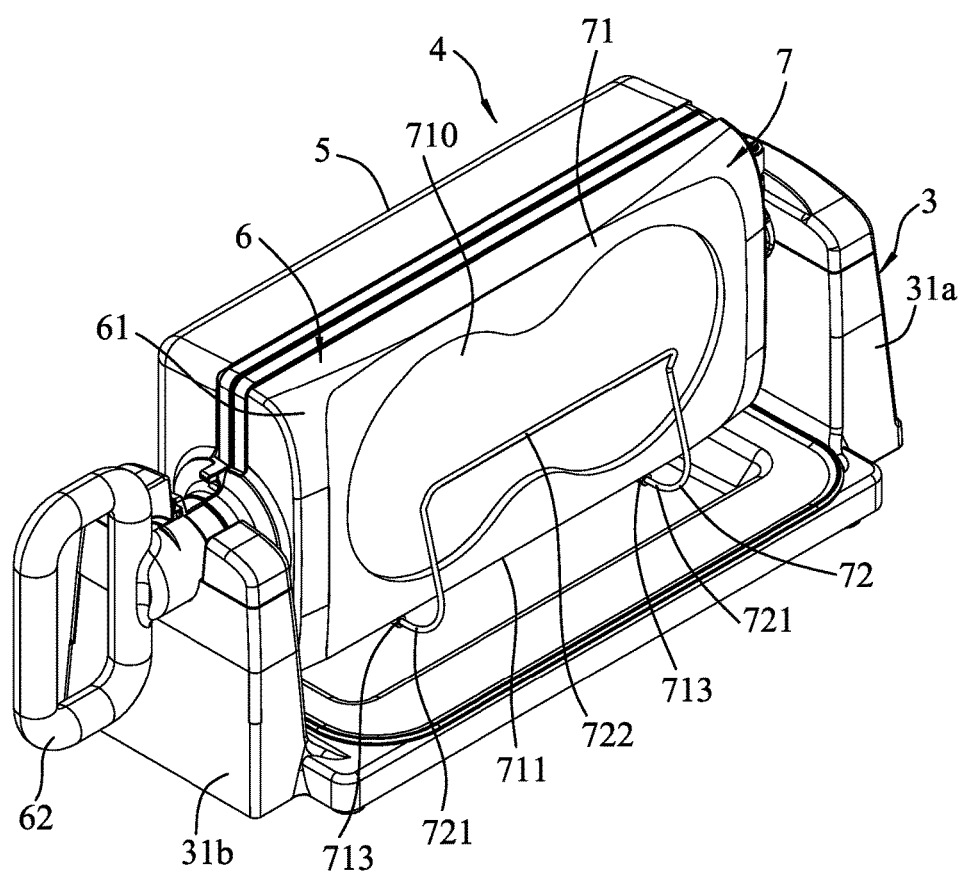
FIG. 9 is a schematic perspective view illustrating the third embodiment at a draining position.

Referring to FIGS. 8 and 9, the third embodiment of the grill according to the disclosure is similar to the first embodiment.

The auxiliary heating pan 71 of the third embodiment further has two mounting portions 713 that are spaced apart from each other in the first direction (D1) and that are disposed adjacent to the first side edge 711 of the auxiliary heating pan 71. The installation segments 721 of the affixing member 72 are respectively and removably mounted to the mounting portions 713 of the auxiliary heating pan 71.

Figure 10:
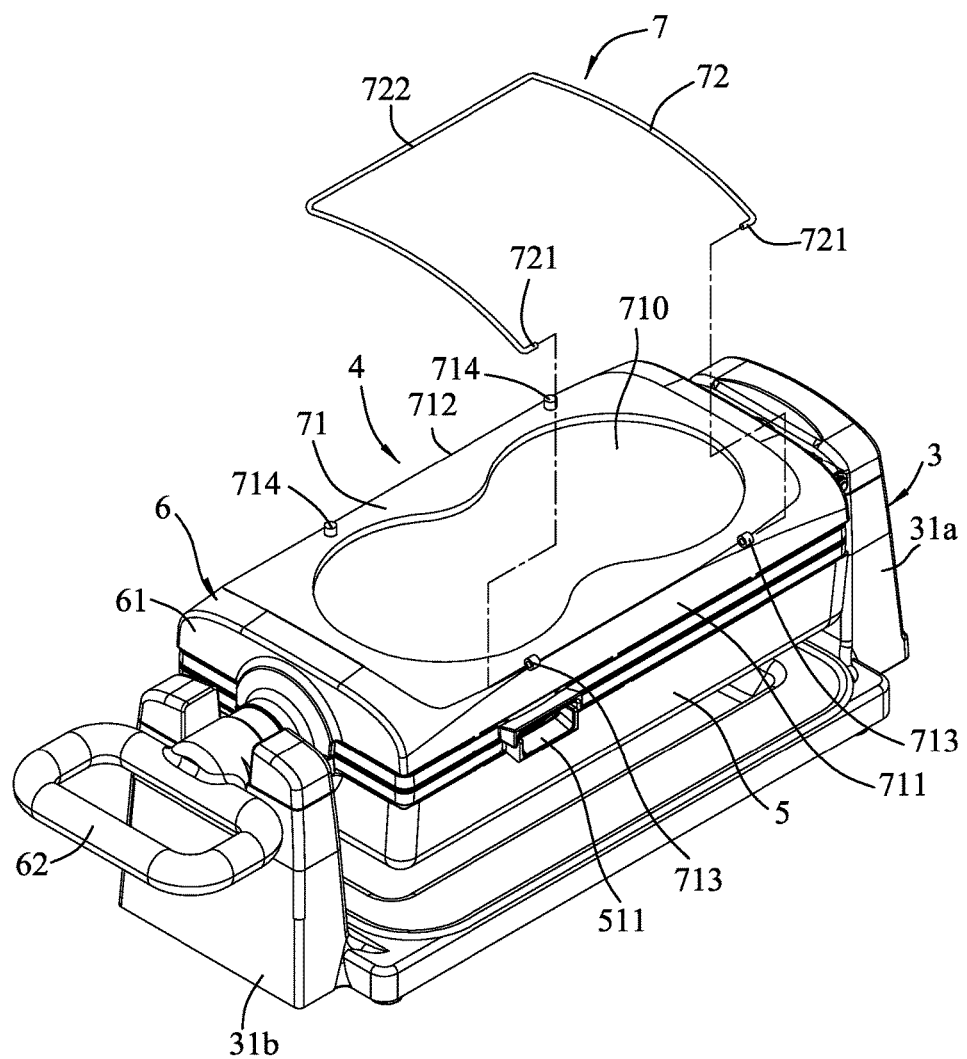
FIG. 10 is a partly exploded perspective view illustrating a fourth embodiment of the grill according to the disclosure.
Figure 11:
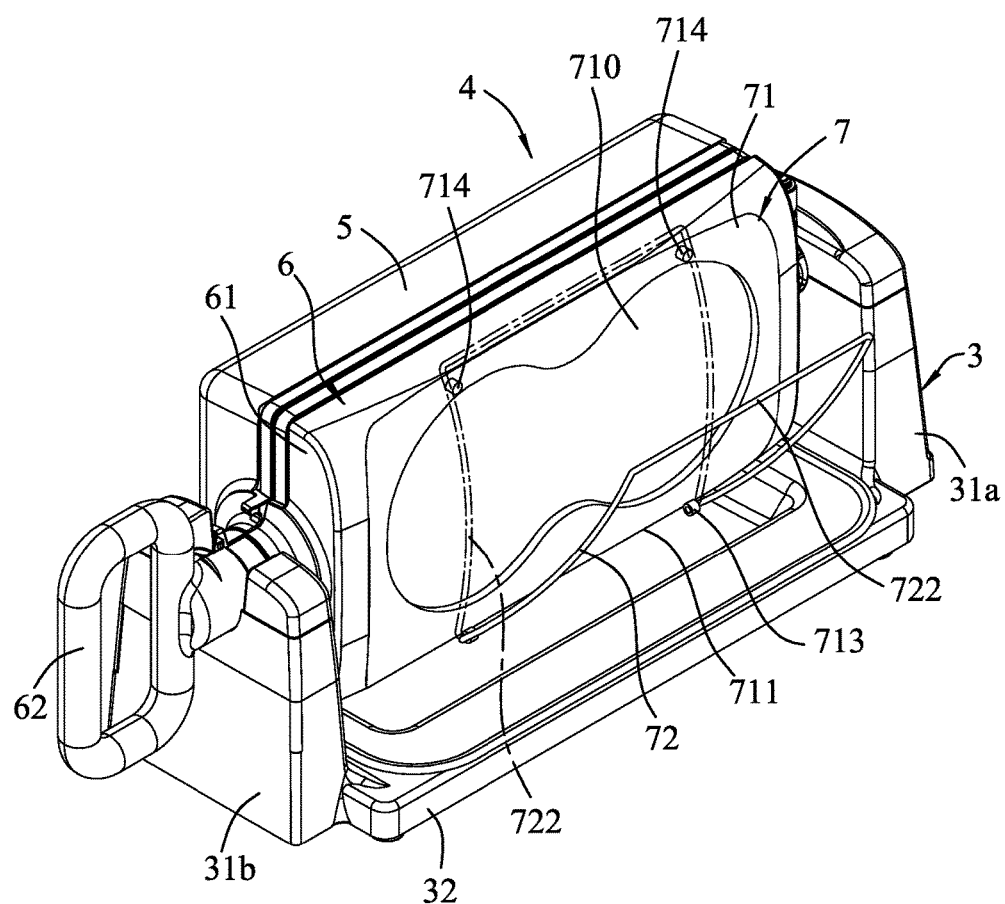
FIG. 11 is a schematic perspective view illustrating the fourth embodiment at a draining position.

Referring to FIGS. 10 and 11, the fourth embodiment of the grill according to the disclosure is similar to the third embodiment.

The auxiliary heating pan 71 of the fourth embodiment further has two positioning protrusions 714 that are spaced apart from each other in the first direction (D1) and that are disposed adjacent to the second side edge 712 of the auxiliary heating pan 71. The mounting portions 713 are configured to be tubular, and are aligned in the first direction (D1). The installation segments 721 of the affixing member 72 are respectively and pivotally mounted to the mounting portions 713 of the auxiliary heating pan 71. The abutment segment 722 of the affixing member 72 separably and resiliently abuts against the positioning protrusions 714. The food disposed in the retaining groove 710 of the auxiliary heating pan 71 is held by the affixing member 72 when the abutment segment 722 is in contact with the positioning protrusions 714, and can be taken away when the abutment segment 722 is separated from the positioning protrusions 714.

Figure 12:
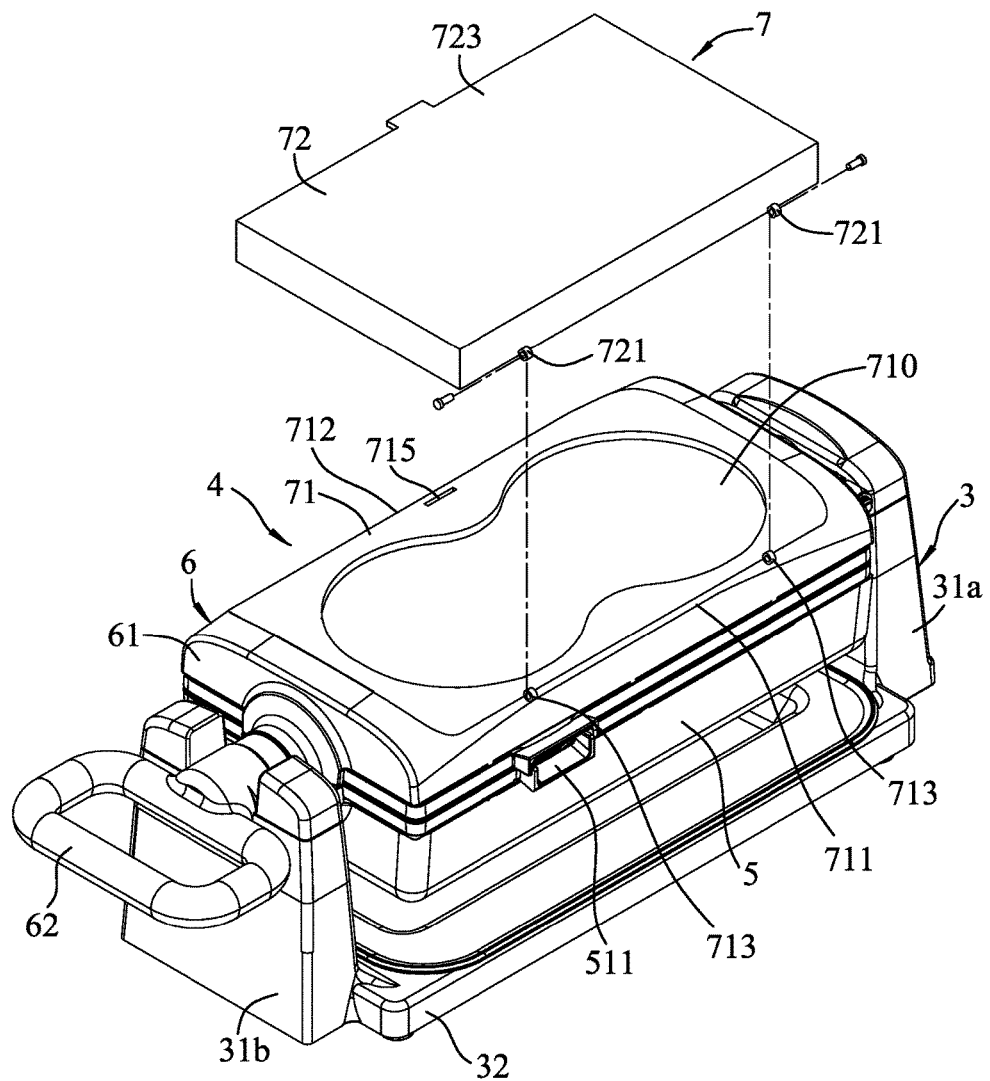
FIG. 12 is a partly exploded perspective view illustrating a fifth embodiment of the grill according to the disclosure.
Figure 13:
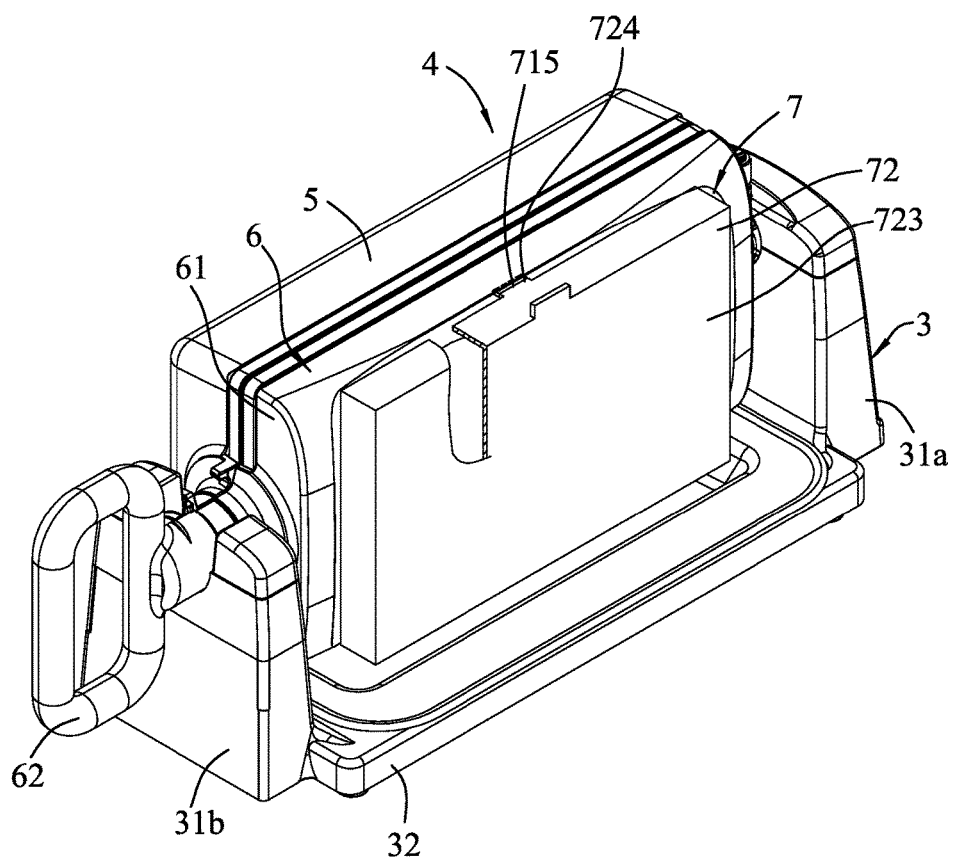
FIG. 13 is a schematic perspective view illustrating the fifth embodiment at a draining position.
Figure 14:
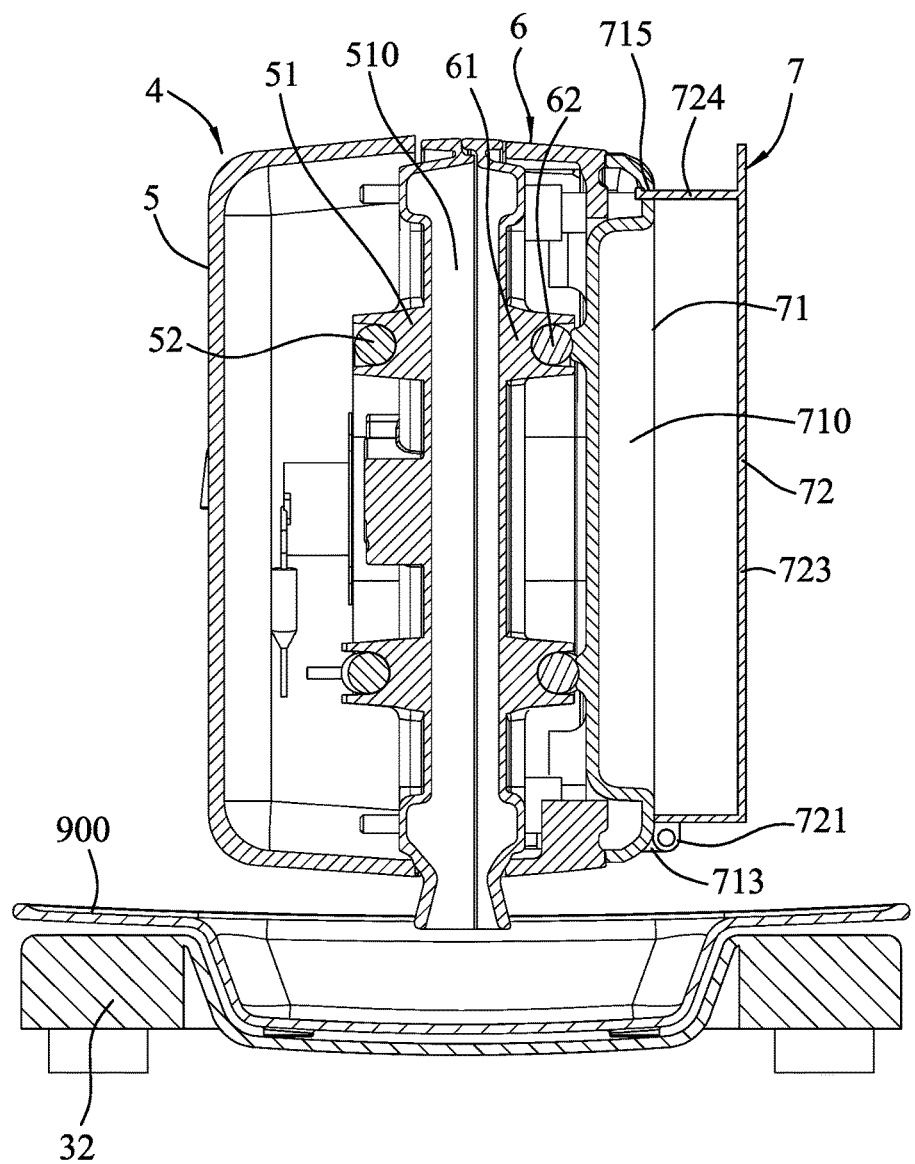
FIG. 14 is a sectional view illustrating the fifth embodiment.

FIGS. 12 to 14 illustrate the fifth embodiment of the grill according to the disclosure.

The auxiliary heating pan 71 of the fifth embodiment further has two tubular mounting portions 713 that are spaced apart from each other and aligned in the first direction (D1) and that are disposed adjacent to the first side edge 711 of the auxiliary heating pan 71, and an engaging groove 715 that is formed in the top surface thereof and that is disposed adjacent to the second side edge 712 of the auxiliary heating pan 71. The affixing member 72 is configured as a cap, and has a cap body 723 that removably covers the retaining groove 710 of the auxiliary heating pan 71, two installation segments 721 that are respectively and pivotally connected to the mounting portions 713, and an engaging projection 724 (see FIG. 13) that is separably snap fitted within the engaging groove 715. The affixing member 72 holds the food disposed in the retaining groove 710 of the auxiliary heating pan 71 when the engaging project ion 724 engages the engaging groove 715, and helps for heat preservation of the food. The affixing member 72 is also configured to receive the food when the grill mechanism 4 is at the draining position and when the engaging projection 724 is separated from the engaging groove 715.

Figure 15:
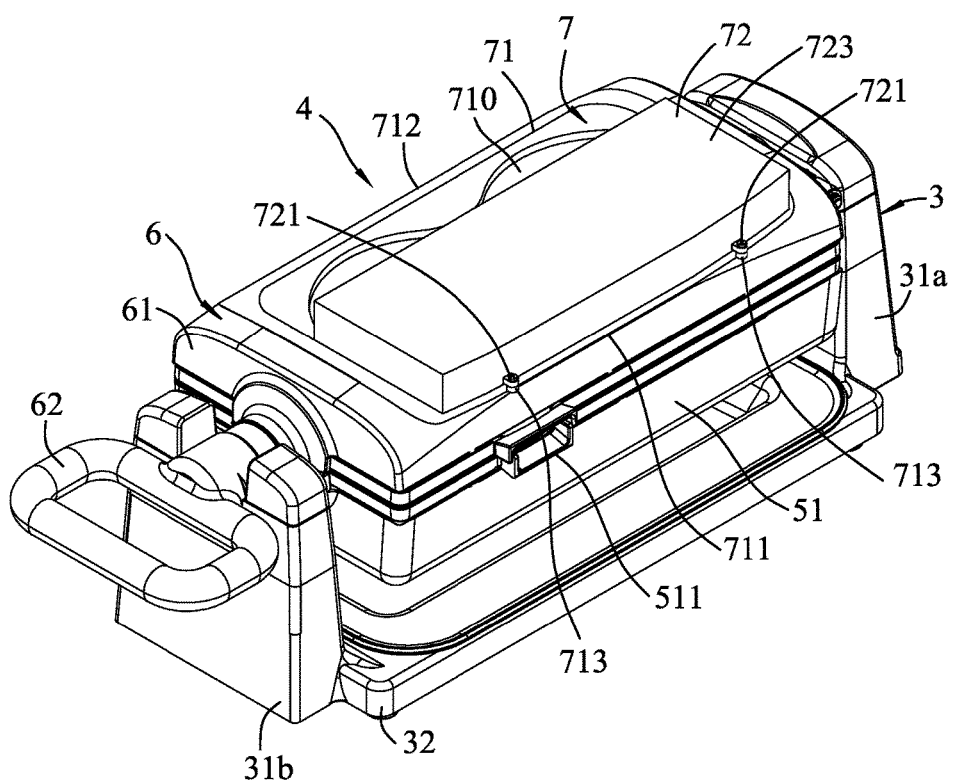
FIG. 15 is a perspective view illustrating a sixth embodiment of the grill according to the disclosure.
Figure 16:
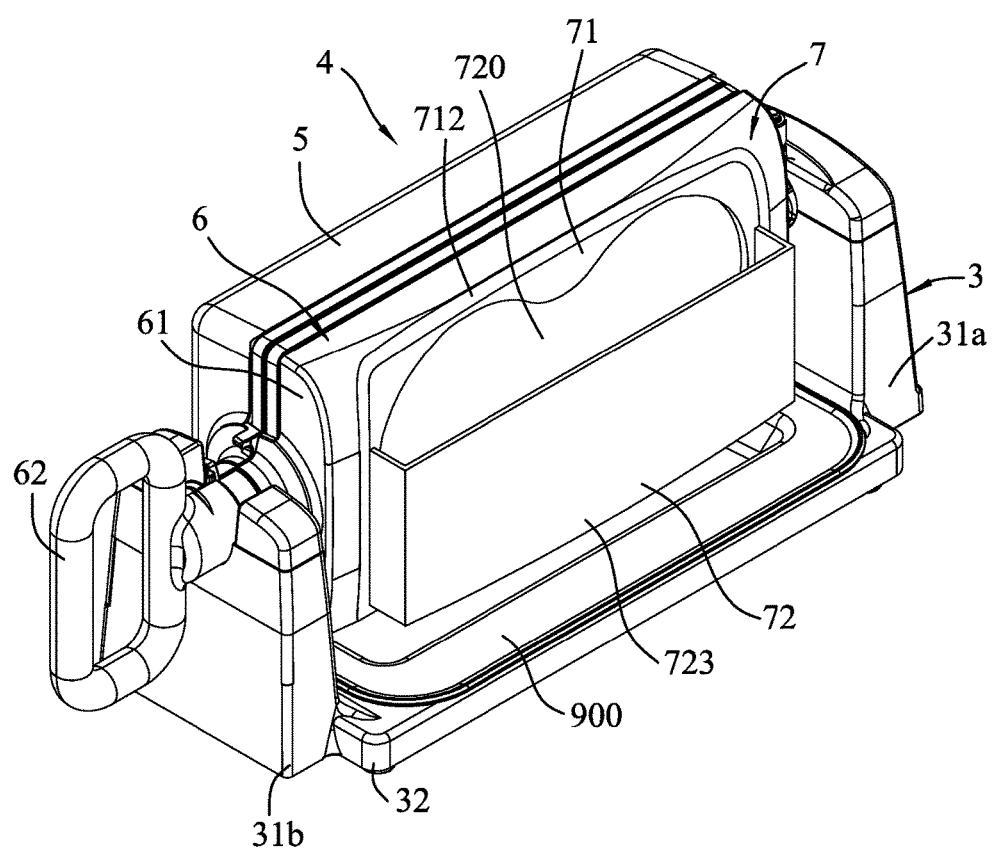
FIG. 16 is a schematic perspective view illustrating the sixth embodiment at a draining position.

FIGS. 15 and 16 illustrate the sixth embodiment of the grill according to the disclosure.

The auxiliary heating pan 71 of the fifth embodiment further has two mounting portions 713 that are spaced apart from each other and aligned in the first direction (D1) and that are disposed adjacent to the first side edge 711 of the auxiliary heating pan 71. The affixing member 72 has two installation segments 721 that are respectively and fixedly connected to the mounting portions 713, and a cover body 723 that is connected fixedly to the installation segments 721 and that partially covers the retaining groove 710 of the auxiliary heating pan 71. The cover body 723 of the affixing member 72 cooperates with the auxiliary heating pan 71 to define a receiving space 720 therebetween that opens toward the second side edge 712 of the auxiliary heating pan 71 for receiving the food.

It should be noted that the auxiliary heating unit 7 of each of the abovementioned embodiments is fixedly disposed on the upper grill unit 6. However, in a variation, the auxiliary heating unit 7 could be fixedly disposed on the lower grill unit 5 and is heated by the heat emitted from the lower grill unit 5. The grill mechanism 4 can be rotated to locate the auxiliary heating unit 7 above the lower grill unit 5 so as to facilitate the food in the retaining groove 710 to be taken away.

To sum up, the grill mechanism 4 is configured to simultaneously heat two opposite sides of the food that is retained in the lower grill space 510, and is operable to move to the draining position by rotating the handle 62 so as to drain the oil released from the food without removal of the food from the lower grill space 510. In addition, the auxiliary heating unit 7 is configured to reuse the heat emitted from the upper grill unit 6 so that power is relatively efficiently used.

In the description above, for the purposes of explanation, numerous specific details have been set forth in order to provide a thorough understanding of the embodiments. It will be apparent, however, to one skilled in the art, that one or more other embodiments maybe practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A grill comprising a base seat and a grill mechanism, said grill mechanism being rotatably mounted to and disposed substantially horizontally on said base seat, and including a lower grill unit, an upper grill unit that is disposed above and pivotally connected to said lower grill unit, and an auxiliary heating unit that is disposed on and in thermal contact with one of said upper and lower grill units, said lower grill unit including a lower pan module that is rotatably mounted to and disposed substantially horizontally on said base seat, and a lower heating module that is disposed on said lower pan module, said upper grill unit including an upper pan module that is pivoted to said lower pan module, and an upper heating module that is disposed on said upper pan module, said grill mechanism being operable to rotate relative to said base seat to a draining position where said lower pan module is substantially vertically disposed, said auxiliary heating unit including an auxiliary heating pan that is heated by heat emitted from the one of said upper and lower grill units, and an affixing member that is mounted to said auxiliary heating pan, that is made of a flexible material, and that has a portion spaced apart from said auxiliary heating pan for resiliently abutting against a food disposed on said auxiliary heating pan.

2. The grill as claimed in claim 1, wherein said lower pan module has a lower grill space that is formed in a top surface thereof, and an oil-draining opening that is formed in a side surface thereof, that is in spatial communication with said lower grill space, and that is disposed under said lower grill space when said grill mechanism is at the draining position, so as to allow oil to be drained from said lower grill space through said oil-draining opening.

3. The grill as claimed in claim 1, wherein said upper grill unit further includes a handle that is connected fixedly to said upper pan module for being operated so as to rotate said grill mechanism to the draining position.

4. The grill as claimed in claim 3, wherein said base seat includes left and right side frames that are spaced apart from each other in a first direction, and a base frame that is connected between said left and right side frames, said left side frame being formed with a pivot hole, said right side frame being formed with a pivot groove that is formed in a top surface of said right side frame, that extends in the first direction and through said right side frame, and that is aligned with said pivot hole in the first direction, said lower pan module having a first axle portion that rotatably engages said pivot hole in said left side frame, and a hemicylindrical second axle portion, said handle of said upper grill unit having a hemicylindrical connecting axle portion that cooperates with said second axle portion of said lower pan module to form a cylindrical axle rotatably engaging said pivot groove in said right side frame, and a handle portion that is connected fixedly to said connecting axle portion for manual operation.

5. A grill comprising a base seat and a grill mechanism, said grill mechanism being rotatably mounted to and disposed substantially horizontally on said base seat, and including a lower grill unit, an upper grill unit that is disposed above and pivotally connected to said lower grill unit, and an auxiliary heating unit that is disposed on and in thermal contact with one of said upper and lower grill units, said lower grill unit including a lower pan module that is rotatably mounted to and disposed substantially horizontally on said base seat, and a lower heating module that is disposed on said lower pan module, said upper grill unit including an upper pan module that is pivoted to said lower pan module, and an upper heating module that is disposed on said upper pan module, said grill mechanism being operable to rotate relative to said base seat to a draining position where said lower pan module is substantially vertically disposed, said auxiliary heating unit including an auxiliary heating pan that is heated by heat emitted from the one of said upper and lower grill units, and an affixing member that is mounted to said auxiliary heating pan for holding a food disposed on said auxiliary heating pan, wherein said lower pan module has a lower grill space that is formed in a top surface thereof, and an oil-draining opening that is formed in a side surface thereof, that is in spatial communication with said lower grill space, and that is disposed under said lower grill space when said grill mechanism is at the draining position, so as to allow oil to be drained from said lower grill space through said oil-draining opening, and wherein said auxiliary heating pan has a first side edge that is proximate to said oil-draining opening, said affixing member being substantially U-shaped, and having two distal end portions that are fixedly connected to said first side edge of said auxiliary heating pan, a middle portion of said affixing member being spaced apart from said auxiliary heating pan.

6. The grill as claimed in claim 5, wherein said affixing member has two installation segments that are fixedly connected to said first side edge of said auxiliary heating pan, and an abutment segment that interconnects distal ends of said installation segments and that is spaced apart from said auxiliary heating pan for resiliently abutting against the food disposed on said auxiliary heating pan.

7. The grill as claimed in claim 5, wherein said auxiliary heating pan further has two mounting portions that are spaced apart from each other in the first direction and that are disposed adjacent to said first side edge of said auxiliary heating pan, said affixing member having two installation segments that are respectively connected to said mounting portions of said auxiliary heating pan, and an abutment segment that interconnects distal ends of said installation segments and that is spaced apart from said auxiliary heating pan for resiliently abutting against the food disposed on said auxiliary heating pan.

8. The grill as claimed in claim 5, wherein said auxiliary heating pan further has a second side edge that is opposite to said first side edge and that is distal from said oil-draining opening, two positioning protrusions that are spaced apart from each other in the first direction and that are disposed adjacent to said second side edge of said auxiliary heating pan, and two mounting portions that are aligned in the first direction and that are disposed adjacent to said first side edge of said auxiliary heating pan, said affixing member having two installation segments that are respectively and pivotally connected to said mounting portions of said auxiliary heating pan, and an abutment segment that is connected to said installation segments and that extends toward said second side edge to resiliently and separably abut against said positioning protrusions.

9. A grill comprising a base seat and a grill mechanism, said grill mechanism being rotatably mounted to and disposed substantially horizontally on said base seat, and including a lower grill unit, an upper grill unit that is disposed above and pivotally connected to said lower grill unit, and an auxiliary heating unit that is disposed on and in thermal contact with one of said upper and lower grill units, said lower grill unit including a lower pan module that is rotatably mounted to and disposed substantially horizontally on said base seat, and a lower heating module that is disposed on said lower pan module, said upper grill unit including an upper pan module that is pivoted to said lower pan module, and an upper heating module that is disposed on said upper pan module, said grill mechanism being operable to rotate relative to said base seat to a draining position where said lower pan module is substantially vertically disposed, said auxiliary heating unit including an auxiliary heating pan that is heated by heat emitted from the one of said upper and lower grill units, and an affixing member that is mounted to said auxiliary heating pan for holding a food disposed on said auxiliary heating pan, wherein said lower pan module has a lower grill space that is formed in a top surface thereof, and an oil-draining opening that is formed in a side surface thereof, that is in spatial communication with said lower grill space, and that is disposed under said lower grill space when said grill mechanism is at the draining position, so as to allow oil to be drained from said lower grill space through said oil-draining opening, and wherein said auxiliary heating pan further has a second side edge that is opposite to said first side edge and that is distal from said oil-draining opening, an engaging groove that is disposed adjacent to said second side edge of said auxiliary heating pan, and two mounting portions that are aligned in the first direction and that are disposed adjacent to said first side edge of said auxiliary heating pan, said affixing member having two installation segments that are respectively and pivotally connected to said mounting portions of said auxiliary heating pan, a cap body that is connected to said installation segments and that removably covers said auxiliary heating pan, and an engaging projection that is separably snap fitted within said engaging groove.

* * * * *